United States Patent
Pratt et al.

(10) Patent No.: US 11,519,680 B2
(45) Date of Patent: Dec. 6, 2022

(54) THREE-WAY MODULATING VALVE FOR TEMPERATURE CONTROL

(71) Applicant: Hamilton Sundstrand Corporation, Charlotte, NC (US)

(72) Inventors: Catherine G. Pratt, Holyoke, MA (US); Caroline R. Hearn, Manchester, CT (US); Diego S. Mugurusa, North Haven, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 39 days.

(21) Appl. No.: 16/934,437

(22) Filed: Jul. 21, 2020

(65) Prior Publication Data

US 2020/0348092 A1 Nov. 5, 2020

Related U.S. Application Data

(63) Continuation of application No. 15/665,654, filed on Aug. 1, 2017, now abandoned.

(51) Int. Cl.
*F28F 27/02* (2006.01)
*F28D 15/06* (2006.01)
(Continued)

(52) U.S. Cl.
CPC .......... *F28F 27/02* (2013.01); *B64D 13/006* (2013.01); *B64D 13/08* (2013.01); *F01P 7/14* (2013.01);
(Continued)

(58) Field of Classification Search
CPC .... F28F 27/02; F28F 2250/06; B64D 13/006; B64D 13/08; F01P 7/14; F01P 2007/146;
(Continued)

(56) References Cited

U.S. PATENT DOCUMENTS

| 1,622,406 A | 3/1927 | Wilhelm |
| 3,542,338 A | 11/1970 | Scaramucci |

(Continued)

FOREIGN PATENT DOCUMENTS

| CN | 202228755 | 5/2012 |
| DE | 2904810 | 10/1979 |

(Continued)

OTHER PUBLICATIONS

Partial European Search Report for EP Application No. 18186848.0 dated Jan. 7, 2019.

(Continued)

*Primary Examiner* — Travis Ruby
(74) *Attorney, Agent, or Firm* — Carlson, Gaskey & Olds, P.C.

(57) ABSTRACT

A temperature sensor for a first fluid senses a temperature of the first fluid downstream of a heat exchanger. A supply for a second fluid changes a temperature of the first fluid. The supply for the second fluid passes through the heat exchanger. A valve is positioned upstream of the said heat exchanger on the supply for the second fluid, and controls a flow rate of the second fluid diverted into a bypass line compared to a flow rate of the second fluid directed through the heat exchanger, with the three-way valve controlled by a control in response to feedback from said temperature sensor. The valve changes the respective flow rates delivered into the bypass line and through the said heat exchanger in a non-linear manner with a change in valve position. A manned spaceship is also disclosed.

14 Claims, 5 Drawing Sheets

(51) Int. Cl.
| | | |
|---|---|---|
| *F01P 7/14* | (2006.01) | |
| *G05D 23/13* | (2006.01) | |
| *B64D 13/00* | (2006.01) | |
| *B64D 13/08* | (2006.01) | |
| *F16K 11/044* | (2006.01) | |
| *F16K 11/085* | (2006.01) | |
| *G05D 23/19* | (2006.01) | |
| *F16K 1/54* | (2006.01) | |
| *F16K 5/12* | (2006.01) | |

(52) U.S. Cl.
CPC .................. *F16K 1/54* (2013.01); *F16K 5/12* (2013.01); *F16K 11/044* (2013.01); *F16K 11/085* (2013.01); *F28D 15/06* (2013.01); *G05D 23/132* (2013.01); *G05D 23/19* (2013.01); *F01P 2007/146* (2013.01); *F01P 2025/52* (2013.01); *F28F 2250/06* (2013.01)

(58) Field of Classification Search
CPC .......... F01P 2025/52; F16K 1/54; F16K 5/12; F16K 11/044; F16K 11/085; F16K 11/076; G05D 23/132
See application file for complete search history.

(56) References Cited

U.S. PATENT DOCUMENTS

| | | |
|---|---|---|
| 3,987,819 A | 10/1976 | Scheuermann |
| 4,007,315 A | 2/1977 | Brinkmann et al. |
| 4,786,294 A | 11/1988 | Jonqueres et al. |
| 4,989,833 A | 2/1991 | Polon |
| 5,074,522 A | 12/1991 | Reynolds et al. |
| 5,957,377 A | 9/1999 | Inoue et al. |
| 6,039,304 A | 3/2000 | Carlson et al. |
| 6,073,858 A | 6/2000 | Obara et al. |
| 6,109,534 A | 8/2000 | Ito et al. |
| 6,109,591 A | 8/2000 | Tuttle et al. |
| 6,257,003 B1 | 7/2001 | Hipsky |
| 6,415,595 B1 | 7/2002 | Wilmot, Jr. et al. |
| 7,111,643 B2 | 9/2006 | Oh |
| 8,375,990 B2 | 2/2013 | Veros |
| 8,899,009 B2 | 12/2014 | Francisco et al. |
| 9,472,819 B2 | 10/2016 | Riordan et al. |
| 9,643,135 B1 | 5/2017 | Mazzei et al. |
| 9,903,481 B2 | 2/2018 | Keller et al. |
| 2001/0030309 A1 | 10/2001 | Carlson et al. |
| 2005/0167169 A1 | 8/2005 | Gering et al. |
| 2006/0118066 A1 | 6/2006 | Martins |
| 2008/0099184 A1 | 5/2008 | Han |
| 2011/0001013 A1 | 1/2011 | Torres Sepulveda et al. |
| 2013/0125566 A1 | 5/2013 | Grefe |
| 2013/0247600 A1 | 9/2013 | Lu et al. |
| 2018/0291798 A1 | 10/2018 | Chopard et al. |

FOREIGN PATENT DOCUMENTS

| | | |
|---|---|---|
| DE | 3125459 | 1/1983 |
| DE | 102015016785 A1 | 4/2017 |
| GB | 2315541 A | 2/1998 |
| JP | H10217755 | 8/1998 |
| WO | 2016080343 | 5/2016 |

OTHER PUBLICATIONS

The Extended European Search Report for EP Application No. 18186848.0, dated May 24, 2019.

THREE-WAY MODULATING VALVE FOR TEMPERATURE CONTROL

CROSS-REFERENCE TO RELATED APPLICATIONS

This application is a continuation of U.S. patent application Ser. No. 15/665,654 filed Aug. 1, 2017.

BACKGROUND OF THE INVENTION

This application relates to a three-way modulating valve placed to modulate the flow of a cooling fluid through a heat exchanger to, in turn, control the temperature of a cooled fluid.

Temperature control systems are known and widely utilized. In one application, a system controls the temperature of the air being delivered into a spacecraft environment.

It is known to pass the air through a heat exchanger to cool the air with a cooling fluid. It is also known to have a three-way modulating valve that modulates the amount of air passing through the heat exchanger such that a percentage of the air may bypass the heat exchanger. In this way, a desired temperature is achieved downstream.

Since the volume of air passing through such a system is large, the size of the modulating valve is also large.

In addition, known modulating valves have generally changed flow rates in a linear manner.

SUMMARY OF THE INVENTION

A system for changing the temperature of a first fluid to meet a desired temperature comprises a fluid supply for the first fluid, the fluid supply for the first fluid passing through a heat exchanger. A temperature sensor for the first fluid senses a temperature of the first fluid downstream of the heat exchanger. A supply for a second fluid changes a temperature of the first fluid. The supply for the second fluid passes through the heat exchanger. A valve is positioned upstream of the said heat exchanger on the supply for the second fluid, and controls a flow rate of the second fluid diverted into a bypass line compared to a flow rate of the second fluid directed through the heat exchanger, with the three-way valve controlled by a control in response to feedback from said temperature sensor. The valve changes the respective flow rates delivered into the bypass line and through the heat exchanger in a non-linear manner with a change in valve position A manned spaceship is also disclosed.

These and other features may be best understood from the following drawings and specification.

These and other features may be best understood from the following drawings and specification.

DETAILED DESCRIPTION

Figure 1:
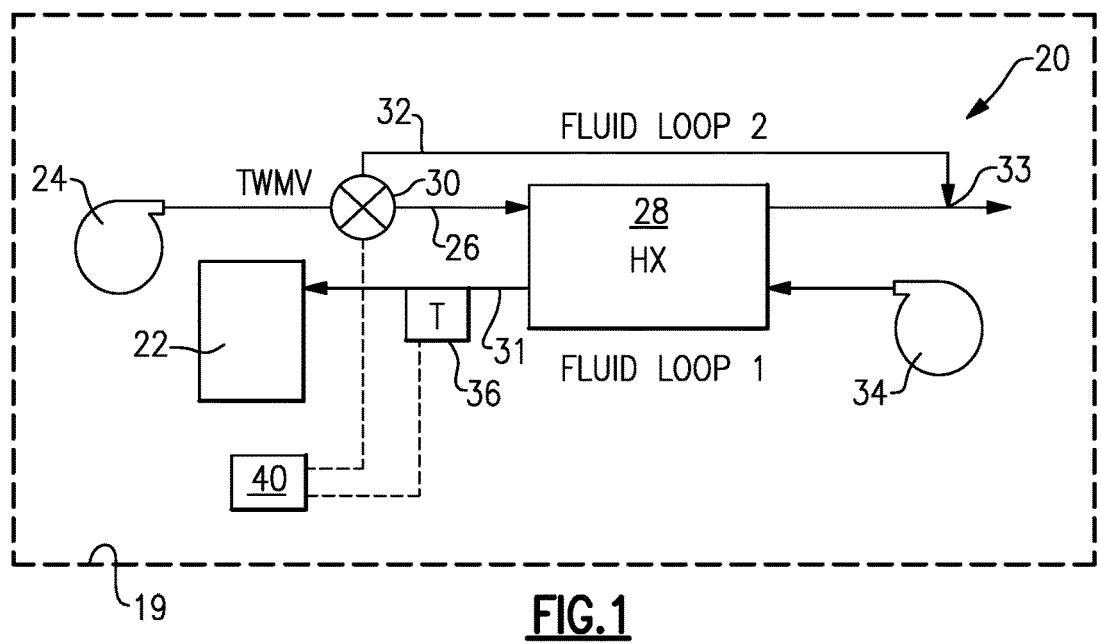
FIG. 1 schematically shows a system.

FIG. 1 shows an airflow system 20 for delivering air into interior 22 of a manned spacecraft 19 (shown schematically). While this particular application is disclosed, it should be understood that the teachings of this disclosure would extend to other applications.

A pump 24 moves a cooling fluid through a line 26 to heat exchanger 28. The cooling fluid line includes a three-way modulating valve 30 which may selectively divert a portion of the cooling fluid into a bypass line 32, which bypasses the heat exchanger 28. The lines 26 and 32 may reconnect at a downstream point 33.

The modulating valve 30 is able to control the respective flow rate going to the bypass line 32 compared to the flow rate to line 26, and heat exchanger 28. The modulating valve 30 is capable of infinitely varying the respective flow rates between 0 and 100%.

A control 40 is shown schematically controlling the valve 30 and taking in feedback from a temperature sensor 36. Temperature sensor 36 senses the temperature of air in a line 31 downstream of the heat exchanger 28. A fan 34 drives air through the heat exchanger 28 to be cooled to a temperature desired and achieved by control 40.

By placing the modulating valve 30 on the cooling fluid line, rather than the airflow line, the size of the valve may be dramatically reduced compared to the prior art mentioned above.

The valve 30 has unique characteristics. In particular, the valve 30 achieves non-linear flow bypass as a function of valve position. The non-linear flow bypass ratio profile is tailored to compensate for a non-linear response of the heat exchanger. That is, the heat exchanger 28 does not behave in a linear fashion dependent on the flow rate of cooling fluid delivered through the heat exchanger 28. As should be understand, Applicant has recognized that a linear change in flow rate would result in a non-linear change in temperature.

In addition, the valve 30 has a pressure drop profile tailored to balance a pressure drop across the heat exchanger. That is, as the flow rate of cooling fluid passing through the heat exchanger changes, the pressure drop across the heat exchanger would also change. Due to the valve's unique pressure drop profile, an overall system hydraulic resistance remains relatively constant regardless of the valve position. This simplifies the design of the centrifugal pump 24 and allows the use of a relatively less expensive fixed speed pump 24. This characteristic reduces the induction of variation in system flow rate across the whole system 20.

Figure 2:
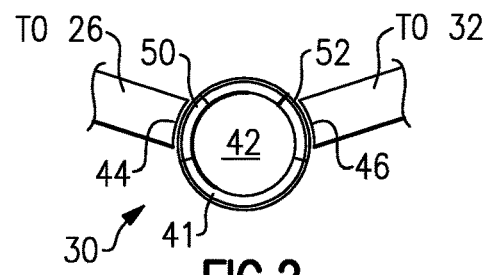
FIG. 2 shows a valve incorporated into the FIG. 1 system.

In one embodiment, the non-linear flow bypass ratio and the pressure drop profile are achieved by a shape of valve windows in the valve 30. As shown in FIG. 2, the valve 30 generally includes a rotating spool 41 receiving the cooling fluid into a central chamber 42. The fluid then flows outwardly through windows 50 and 52.

Outlets 44 and 46 are formed in a valve housing. Outlet 44 delivers fluid to line 26 and hence to the heat exchanger. Outlet 46 delivers the fluid to the bypass line 32.

Figure 3:
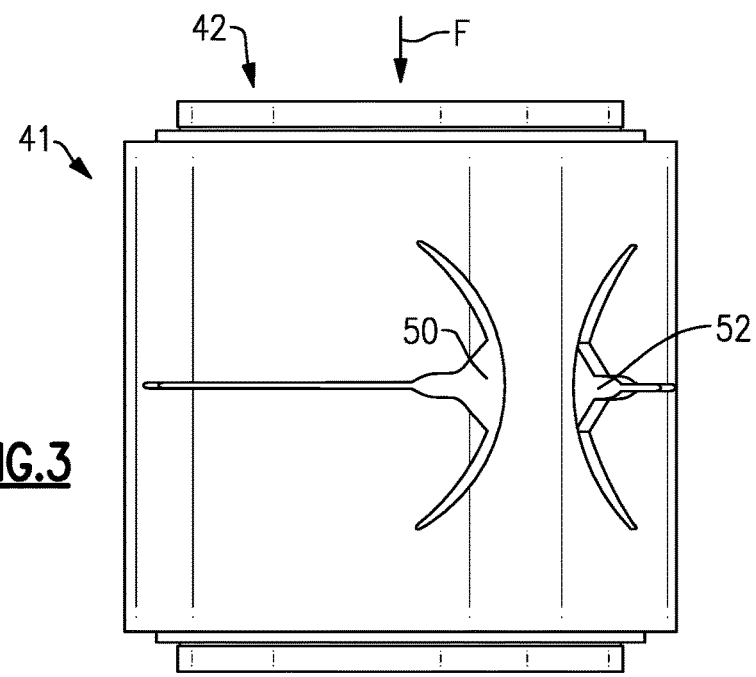
FIG. 3 shows a portion of the valve of FIG. 2.

FIG. 3 shows the spool 41. The fluid is delivered into the interior as shown by arrow F. It then flows outwardly through a window profile defined by window portions 50 and 52.

Figure 4A:
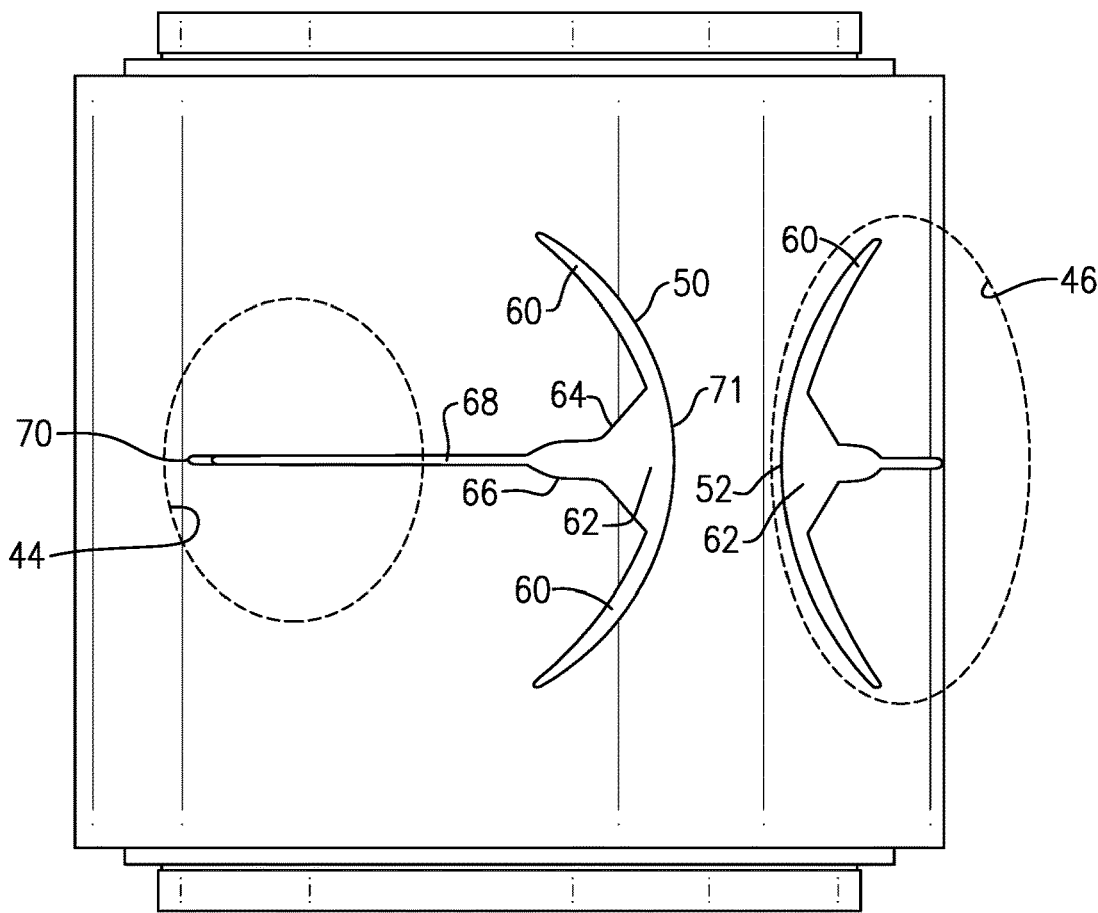
FIG. 4A shows an operational feature.

As shown in FIG. 4A, the profiles 50 and 52 may be generally symmetrical and have a very large, non-linear change in area across a circumferential extent. At one circumferential end 70, flow area is small.

In FIG. 4A, this is shown aligned with the opening 44. In the positions shown in FIG. 4A, there would be a relatively small amount of fluid being delivered to the heat exchanger 28 compared to the amount delivered from the relatively large portions defined by wings 60 and central portion 62, which are communicating with the outlet 46.

However, as the spool 41 moves circumferentially, one can appreciate that the size of the window 52 aligned with the passage 46 will move into smaller portions such that it approaches the end 70 (not shown for profile 52, but it is the same as profile 50).

Thus, as the control 40 changes the circumferential location of the spool 41, the amount of fluid delivered into lines 26 and 32 varies in a non-linear fashion. In addition, the specific shape of the windows 50 and 52 is selected to achieve the pressure drop control.

In the illustrated embodiment, an end 71 opposite to end 70 is the relatively large volume portion and includes the central portion 62 and the wings 60. As shown, angled ends 64 extend from a central portion 62 into a smaller central portion 66 and then into a tapering portion 68 that eventually leads to the end 70.

It could be said each of the first and second windows 50, 52 have an enlarged area portion and change to smaller areas in a non-linear manner when moving in a circumferential direction. As can be seen, the first and second valve windows 50, 52 have enlarged area portions 62 which are circumferentially adjacent to each other and smaller area portions 68 which are circumferentially spaced from each other. The enlarged area portion 62 extends between enlarged ends and wings 60 in a direction generally perpendicular to the circumferential direction.

Figure 4B:
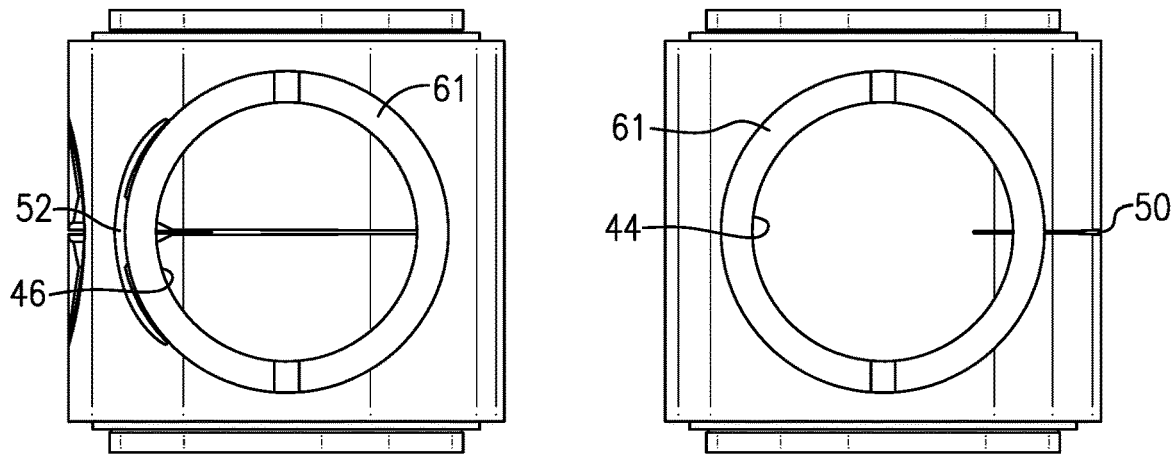
FIG. 4B shows another feature.

FIG. 4B shows one position, wherein the outlet 46 is aligned with a greater volume of the window 52 than is the outlet 44 aligned with the window 50. As also shown in FIG. 4B, there are gaskets or seals 61 sealing off the rest of the window from the flow path into the respective outlets 44 and 46.

While a rotary valve is shown, a similar non-linear bypass effect can be achieved in other ways. In one embodiment, the valve may move along an axial direction to achieve non-linear flow.

Figure 5:
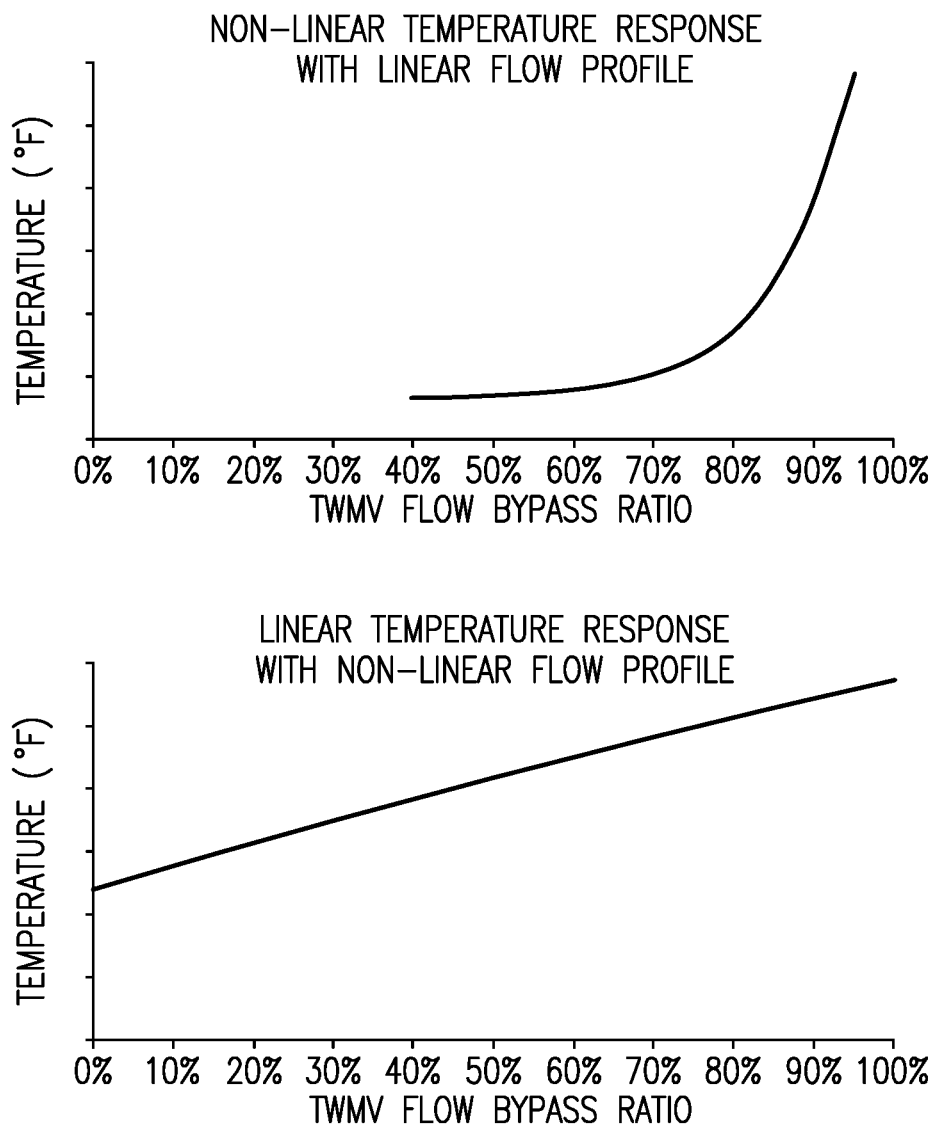
FIG. 5 is a graph showing a change in temperature achieved by a respective amount of flow bypass around a heat exchanger with and without the non-liner valve.

As shown in FIG. 5, due to the non-linear valve, the temperature response seen in the air being cooled is relatively linear with a change in bypass ratio.

This can be explained by reference to FIG. 5.

Figure 6:
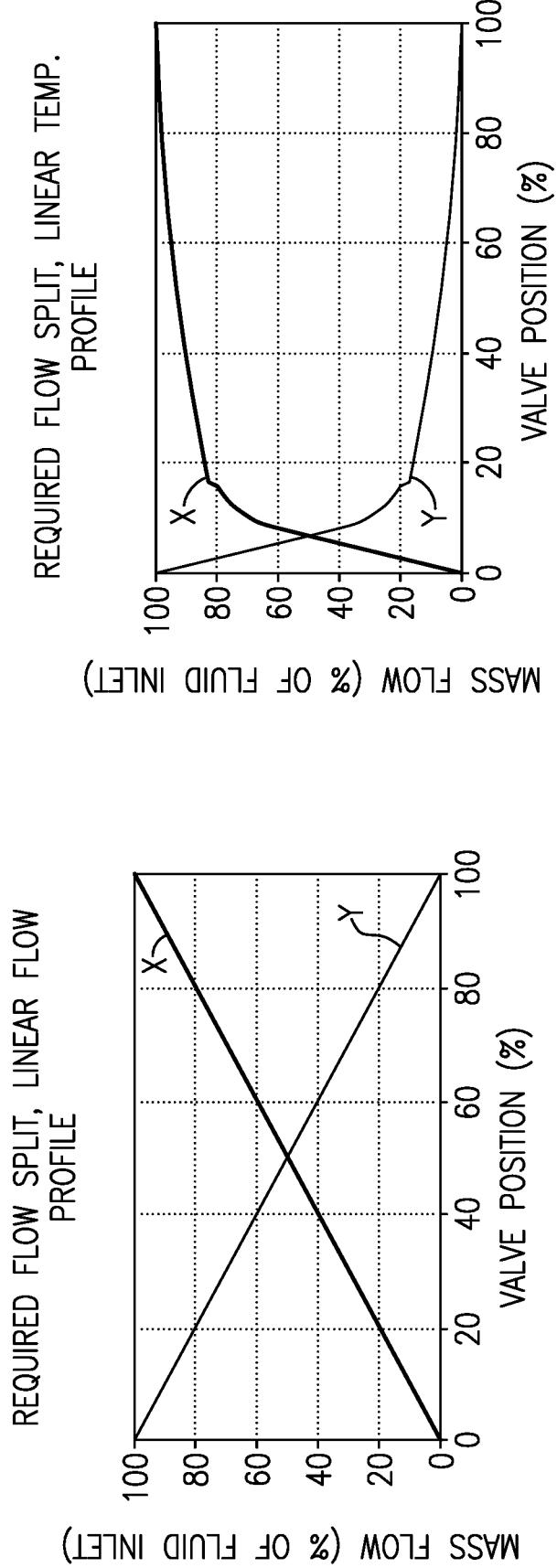
FIG. 6 compares the prior art flow split with a non-linear valve as disclosed here.

FIG. 6 compares a flow split for a linear flow profile with that for a non-linear flow. As can be appreciated in the left-hand graph, a change in the primary flow X moves in a linear manner compared to a change in the secondary or bypass flow Y.

However, as shown on the graph to the right, with a non-linear flow split, the primary flow X and the secondary flow Y change in a non-linear manner.

As mentioned above, Applicant has recognized that such a change will result in a linear temperature change for the fluid to be cooled.

Figure 7:
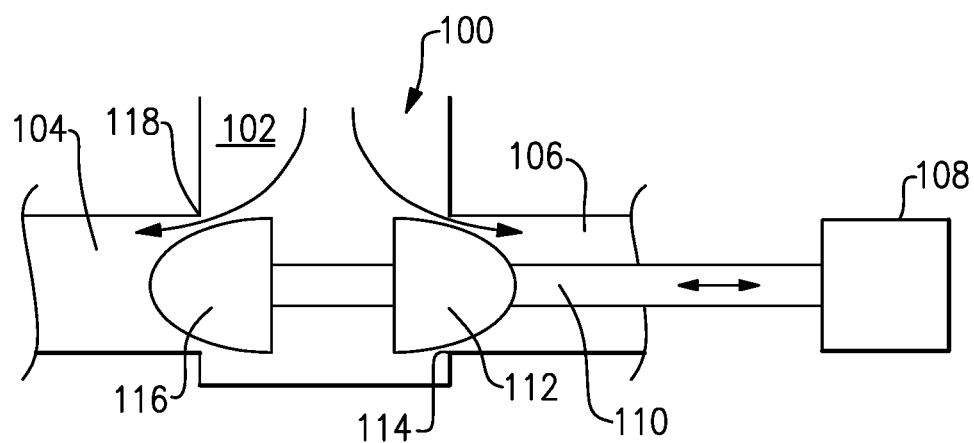
FIG. 7 shows another embodiment.

Another embodiment 100 is shown in FIG. 7. Here, a fluid supply 102 is split between supplies 104 and 106, leading to a heat exchanger 28, and a bypass line, as shown in FIG. 1.

An actuator 108 moves a shaft 110 in a linear direction to move two valve pistons 112 and 116 relative to valve seats 114 and 118. The change in flow rates would not be non-linear in this embodiment, for reasons mentioned above.

The change in pressure drop feature mentioned above will preferably also be achieved by this embodiment.

Applicant has also recognized that symmetric windows such as shown in FIGS. 3 and 4A may not be the most preferred embodiment.

Figure 8:
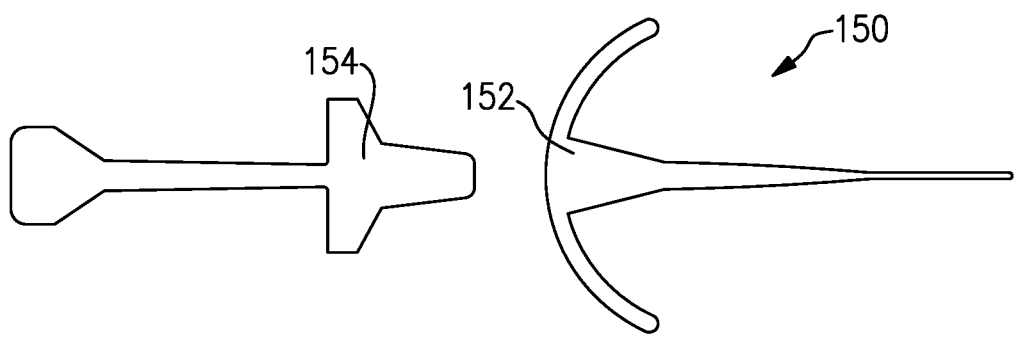
FIG. 8 shows yet another embodiment.

Rather, Applicant has recognized that a linear temperature profile may be best achieved by having different changes in the respective flow rate. As an example, FIG. 8 shows an embodiment 150 wherein a window 154 supplies fluid to the heat exchanger and another window 152, supplies fluid to the bypass. Windows 152 and 154 have different shapes, or profiles. That is, they are non-symmetric.

In one example, as the window 154 begins to be closed, it gains 80% of flow within a first 18% of rotation, in one example. On the other hand, as the window 152 moves to close, it gains only 20% of flow over 82% of rotation. Thus, in this example, the windows 154 and 152 provide equal flow at approximately 8% of the rotary valve position, as opposed to 50%.

Of course, these numbers are simply examples; The specifics of a particular system will dictate the respect flow rates. Armed with this disclosure, a worker of ordinary skill in this art will be able to recognize how to design the windows to achieve this flow. The profiles of the valve pistons 112 and 116 in the FIG. 7 embodiment can also be modified in view of this concept such that they are not symmetric.

A unique system is disclosed for providing a controlled supply of a cooled fluid. It should be understood that a system would have benefits in many other applications. As only one example, the fluid with the controlled temperature and without the bypass valve might be heated rather than cooled.

This disclosure provides a temperature response in a first fluid that approaches a linear change, with respect to a modulating valve position for a second fluid. The valve modulates the second fluid saves weight and volume. The valve design has a nonlinear flow split to achieve this feature.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system for changing the temperature of a first fluid to meet a desired temperature comprising:
   a fluid supply for said first fluid, said fluid supply for said first fluid passing through a heat exchanger, and a temperature sensor for said first fluid to sense a temperature of said first fluid downstream of said heat exchanger;
   a supply for a second fluid to change a temperature of said first fluid, said supply for said second fluid passing through said heat exchanger;
   a three-way valve positioned upstream of said heat exchanger on said supply for said second fluid, and controlling a flow rate of said second fluid diverted into a bypass line compared to a flow rate of said second fluid directed through said heat exchanger, with said three-way valve controlled by a control in response to feedback from said temperature sensor;
   said three-way valve changes the respective flow rates delivered into said bypass line and through said heat exchanger in a non-linear manner with a change in valve position;

a control to control a position of said three-way valve, and a sensor for sensing a temperature of the first fluid downstream of the heat exchanger, said sensor communicating the temperature to said control said control positioning the valve such that the non-linear change in said flow rate delivered into said bypass line and through said heat exchanger result in a temperature change in said first fluid that is substantially linear;

said three-way valve including a rotating spool with a first window delivering said second fluid to a first outlet leading to said bypass line and a second window delivering said second fluid into a second outlet leading to said heat exchanger, and said spool having an interior chamber to receive said second fluid from said supply for the second fluid and communicate the second fluid to the first and second windows;

said control changing a circumferential position of the valve to achieve said non-linear flow rates; and said supply for the second fluid connected into said interior chamber by an end surface, and said first and second windows being formed in side walls of said rotating spool, and there being a valve housing surrounding said valve, and including said first outlet and said second outlet, such that said first outlet and said second outlet communicate with said interior chamber through the first and second windows.

2. The systems as set forth in claim 1, wherein said second fluid cools said first fluid.

3. The system as set forth in claim 1, wherein said first and second windows are identical.

4. The system as set forth in claim 3, wherein each of said first and second windows have an enlarged area portion and which change in a non-linear manner when moving in a circumferential direction, wherein said enlarged area portion having a generally curved central portion and extending into wings on each side of said central portion, and angled ends extending from said central portion into a smaller central portion, and then tapering into a tapering portion that eventually leads to an end, and wherein an inlet extends into a central chamber within said rotating spool, and then flows through said first and second windows to said bypass line and said heat exchanger, respectively.

5. The system as set forth in claim 4, wherein said first and second windows are also designed to achieve a change in pressure drop as said valve spool rotates to, in turn keep a total pressure drop across said system between said valve and said heat exchanger that is relatively close to constant as said valve changes the portion of the second fluid passing through said heat exchanger.

6. The system as set forth in claim 1, wherein said valve is designed to achieve a change in pressure drop as said valve moves to, in turn attempt to keep a total pressure drop across said system between said valve and said heat exchanger constant as said valve changes the portion of the second fluid passing through said heat exchanger, wherein said enlarged area portion having a generally curved central portion and extending into wings on each side of said central portion, and angled ends extending from said central portion into a smaller central portion, and then tapering into a tapering portion that eventually leads to an end, and wherein an inlet extends into a central chamber within said rotating spool, and then flows through said first and second windows to said bypass line and said heat exchanger, respectively.

7. The system as set forth in claim 1, wherein said first and second windows having different shapes such that they are asymmetric.

8. A system for supplying air into an interior of a manned spacecraft comprising:

a fluid supply for said air, said fluid supply for said air passing through a heat exchanger, and a temperature sensor for said air to sense a temperature of said air downstream of said heat exchanger;

a supply for a second fluid to change a temperature of said air, said supply for said second fluid passing through said heat exchanger;

a three-way valve positioned upstream of said heat exchanger on said supply for said second fluid, and controlling a flow rate of said second fluid diverted into a bypass line compared to a flow rate of said second fluid directed through said heat exchanger, with said valve controlled by a control in response to feedback from said temperature sensor;

said three-way valve changes the respective flow rates delivered into said bypass line and through said heat exchanger in a non-linear manner with a change in valve position;

a control to control a position of said three-way valve, and a sensor for sensing a temperature of the air downstream of the heat exchanger, said sensor communicating the temperature to said control said control positioning the valve such that the non-linear change in said flow rate delivered into said bypass line and through said heat exchanger result in a temperature change in said air that is substantially linear;

said three-way valve including a rotating spool with a first window delivering said second fluid to a first outlet leading to said bypass line and a second window delivering said second fluid into a line leading to said heat exchanger, and said spool having an interior chamber to receive said second fluid from said supply for the second fluid and communicate the second fluid to the first and second windows;

said control changing a circumferential position of the valve to achieve said non-linear flow rates; and said supply for the second fluid connected into said interior chamber by an end surface, and said first and second windows being formed in side walls of said rotating spool valve, and there being a valve housing surrounding said valve, and including said first outlet and said second outlet, such that said first outlet and said second outlet communicate to said interior chamber through the first and second windows.

9. The system as set forth in claim 8, wherein said second fluid cools said first fluid air.

10. The system as set forth in claim 9, wherein said first and second windows are identical.

11. The system as set forth in claim 10, wherein each of said first and second windows have an enlarged area portion and which change in a non-linear manner when moving in a circumferential direction, wherein said enlarged area portion having a generally curved central portion and extending into wings on each side of said central portion, and angled ends extending from said central portion into a smaller central portion, and then tapering into a tapering portion that eventually leads to an end, and wherein an inlet extends into a central chamber within said rotating spool, and then flows through said first and second windows to said bypass line and said heat exchanger, respectively.

12. The system as set forth in claim 11, wherein said first and second windows are also designed to achieve a change in pressure drop as said valve spool rotates to, in turn keep a total pressure drop across said system between said valve and said heat exchanger that is relatively close to constant as said valve changes the portion of the second fluid passing through said heat exchanger.

13. The system as set forth in claim 8, wherein said valve is designed to achieve a change in pressure drop as said valve moves to, in turn attempt to keep a total pressure drop across said system between said valve and said heat exchanger constant as said valve changes the portion of the second fluid passing through said heat exchanger, wherein said enlarged area portion having a generally curved central portion and extending into wings on each side of said central portion, and angled ends extending from said central portion into a smaller central portion, and then tapering into a tapering portion that eventually leads to an end, and wherein an inlet extends into a central chamber within said rotating spool, and then flows through said first and second windows to said bypass line and said heat exchanger, respectively.

14. The system as set forth in claim 8, wherein said first and second windows having different shapes such that they are asymmetric.

* * * * *